Patented Sept. 6, 1932

1,876,008

UNITED STATES PATENT OFFICE

RICHARD HUPE, OF KONSTANZ, GERMANY, ASSIGNOR, BY MESNE ASSIGNMENTS, TO DEUTSCHE GOLD- & SILBER-SCHEIDEANSTALT VORMALS ROESSLER, OF FRANKFORT-ON-THE-MAIN, GERMANY, A CORPORATION OF GERMANY

PROCESS FOR THE HYDROGENATION OF NAPHTHALENE

No Drawing. Application filed October 6, 1931, Serial No. 567,315, and in Germany October 7, 1930.

The present invention relates to the treatment of naphthalene with hydrogen at high temperatures in order to form primary products of hydrogenation of the naphthalene such as tetrahydronaphthalene and decahydronaphthalene and further to produce by destructive hydrogenation other products in addition, and particularly hydrocarbons of the benzol series. The purpose of the invention is to produce primary products of hydrogenation of the naphthalene while avoiding as much as possible the formation of other products.

It has already been proposed in United States Patent No. 1,733,908 of Schrauth to hydrogenate purified naphthalene by treatment with hydrogen at moderately raised pressures, for example, 10 atmospheres and moderately raised temperatures, for example, 150 to 200° C.

According to another known process described in British Patent No. 147,474 of Schroeter, purified naphthalene is hydrogenated with the theoretical amount of hydrogen at moderately raised temperatures, for example 120 to 150° C. by means of catalysts such as nickel. It is stated in this patent that the pressure is of small importance; the reaction only proceeds somewhat more quickly at 50 to 100 atmospheres than at 3 to 10 atmospheres.

It has already been proposed in British Patent No. 283,600 to hydrogenate cyclic compounds including naphthalene at temperatures by heating above 300° C. in the presence of mixed catalysts which, for example, might contain iron, cobalt, nickel, by means of hydrogen at reduced pressure, at the usual pressure or slightly raised pressure. In this case it is expressly recommended to free the cyclic compounds to be hydrogenated and the gases or gaseous mixtures serving as hydrogenation gases from contact poisons such as sulphur. In the examples given in this patent which refer to hydrogenation of naphthalene, that is Examples 4 and 5, the treatment is carried out at the normal pressure. In one case the temperature amounted to 350° C., in other cases to 400 to 450° C. Benzene was obtained as the chief product of the reaction.

These known processes of hydrogenating naphthalene are based on the idea that sulphur compounds constitute contact poisons and must be removed as far as possible before hydrogenation. Subsequent working on these known processes has shown that they give rise only to a very small amount of conversion of naphthalene and the yields of products of hydrogenation of high value are relatively small.

The present invention, on the other hand, effects the hydrogenation of naphthalene with very high speed of reaction and produces large yields of primary products of hydrogenation which are obtained direct in a very pure form. The new process consists in carrying out the hydrogenation of naphthalene in the presence of excess of hydrogen, while employing pressures of more than 50 atmospheres, for example pressures such as 100 to 500 atmospheres and more, at temperatures which are comparatively high but lie below the point at which a sudden fall in temperature occurs, and by employing catalysts which contain iron, cobalt or nickel, while care is taken that such amounts of hydrogen sulphide are present that the action of the catalysts containing the iron, nickel or cobalt is improved by the presence of the hydrogen sulphide.

In order to explain the sudden fall of temperature the following may be stated:—

If naphthalene is subjected to heating under pressure with excess of hydrogen in the presence of the catalysts in question then upon reaching a certain temperature a definite fall in temperature takes place which corresponds to an absorption of heat by the naphthalene of at least 3,000 to 4,000 calories per gram-molecule and which is caused by the endothermic splitting of the naphthalene ring to be hydrogenated.

The critical temperature point lies in general within relatively narrow limits, for example between 450 and 500° C., but these limits are dependent upon the operating conditions selected, for example, upon the particular catalyst employed, the partial pressure of the hydrogen and so forth.

According to the present invention the hydrogenation is carried out at relatively high temperatures, but at temperatures lying below the critical temperature point. In general, it has proved to be of advantage to work at temperatures which are slightly, for example about 20° below the critical point. In general, the lower limit of temperature which comes into question is about 100° below the critical point. It is recommended to arrange the time of reaction so that splitting up of the primary products of hydrogenation is avoided; such splitting up may occur when working below the critical temperature if the reaction mixture is maintained under the reaction conditions longer than is necessary for the formation of the primary products of hydrogenation sought after.

The catalysts employed may be compounds of metals of the iron sub-group of the eighth group of the periodic system of classification, that is to say, iron, nickel and cobalt and oxygen compounds, that is to say, oxides of the said metals may be used with advantage. Further, sulphur compounds that is to say, sulphides of the said metals, may be employed, for example, as also the metals themselves. It is to be recommended to determine the best suited catalyst from case to case by preliminary tests. In many cases, it has proved to be advantageous to employ mixtures of the said catalysts with one another or with other materials, for example metals or metal compounds.

The use of such catalysts for hydrogenation processes and in particular, for processes of destructive hydrogenation is in itself known. As has been found, however, the iron, nickel and cobalt catalysts to be employed according to the present invention, take up a special position among the thousands of known hydrogenation catalysts insofar as they are capable of yielding combinations of catalysts with hydrogen sulphide which yield better results than the iron, nickel or cobalt catalysts alone. This fact is surprising to a high degree since sulphur compounds are generally regarded as catalyst poisons and a number of proposals have been made recommending the removal of sulphur compounds before the hydrogenation itself. Thus, for example, in British Patent No. 329,688, it is proposed to free the circulated gases so thoroughly from hydrogen sulphide that the hydrogenation gas no longer contains more than 0.3% of hydrogen sulphide. The object in that case is so to reduce the content of hydrogen sulphide by special means that the remaining small amounts can no longer produce the combination effects which are produced according to the present invention. Similarly, for example, in French Patent No. 620,632, it is proposed to treat starting material containing sulphur in such a way that the sulphur is converted into hydrogen sulphide before the hydrogenation by a special process and the hydrogen sulphide is removed.

In the hydrogenation of naphthalene the presence of sulphur compounds has been particularly avoided. Thus, for example, the above-mentioned United States Patent No. 1,733,908 and British Patent No. 147,474 refer to the treatment of purified naphthalene. In British Patent No. 283,600, it is also recommended to free both the cyclic compounds to be hydrogenated as well as the gases or gaseous mixtures from contact poisons "such as sulphur". In the same patent mixtures of hydrogen with nitrogen, carbon dioxide and the like are recommended as hydrogenation gases, while the same patentees in other processes such as the destructive hydrogenation of coal tar, oils and the like, have mentioned hydrogenation gases containing hydrogen sulphide as permissible. According to this as far as is hitherto known, when so-called catalysts immune to poisoning are used it is to be expected in the most favourable cases that sulphur compounds would not have an injurious action or at least not a too injurious action. In no case, however, was it foreseen that, in the hydrogenation of naphthalene in which previously the presence of sulphur compounds was considered particularly injurious, certain catalysts, actually iron, nickel and cobalt catalysts could be improved considerably in their activity by the presence of definite amounts of hydrogen sulphide.

It has furtheremore been found, that the process can be influenced to a far-reaching extent in the direction of forming the definite desired products by proper selection of the amount of hydrogen. For example, the formation of decahydronaphthalene is promoted by employing high partial pressures of hydrogen, for example, such as amount to 95 to 97 per cent of the total pressure, which means about a ratio of 4 parts by weight of hydrogen to 10 parts of the naphthalene. Relatively lower partial pressures of hydrogen, for example, such as 75 to 80 per cent of the total pressure (corresponding to a ratio of about 2.5 parts of hydrogen to 10 parts of naphthalene) on the other hand, promote the formation of tetrahydronaphthalene.

The process may be carried out discontinuously or continuously with a flowing stream of gas. In the latter case, care has to be taken that the ratios of the amounts of naphthalene, hydrogen and hydrogen sulphide present during the reaction, as well as the speed of flow of the mixture of gas and vapour, remain constant during the reaction so that the content of hydrogen sulphide during the process is maintained within the limits favourable for the reaction.

A special advantage of the process consists in the fact that the direct treatment of crude naphthalene containing sulphur can be effected so that the purification of this starting material hitherto usual can be omitted. The sulphur content of the crude naphthalene must be taken into account in such a way that the optimum amount necessary for the combination effect of the hydrogen sulphide and the catalyst is retained.

Examples

Experiments without the addition of sulphur:—

1. 300 gms. of naphthalene are heated for an hour at 450° with 15 gms. of nickel hydroxide in an autoclave with an initial pressure of hydrogen of 110 atmospheres. The yield of products of hydrogenation, that is tetrahydronaphthalene and decahydronaphthalene, amounts to about 10 per cent.

2. 300 gms. of naphthalene are heated with 15 gms. of cobalt hydroxide under the same conditions as above. The yield of products of hydrogenation amounts to 5 per cent.

The two examples set forth show that without the addition of sulphur hydrogenation scarcely takes place at all. The following experiments prove that by means of the experience forming the bases of the invention far better results can be produced than by employing metals or metal compounds alone.

Experiments with the addition of sulphur:—

3. 300 gms. of naphthalene are heated for an hour at 450° in an autoclave with 15 gms. of nickel hydroxide and 23 gms. of sulphur, that is an excess of 6 per cent over the amount equivalent to the nickel. The heating is carried out with an initial pressure of hydrogen of 110 atmospheres. 62 per cent of a product of hydrogenation of specific gravity 0.977 was obtained and boiled below 205° C.

4. 300 gms. of naphthalene are heated with 15 gms. of nickel hydroxide and 29 gms. of sulphur, that is 8 per cent excess over the amount equivalent to the nickel, in an autoclave under the same conditions as in Experiment 1. Only 27 per cent of hydronaphthalene is obtained which has a specific gravity of 0.974. The result shows that in this case the amount of sulphur employed was more than the optimum amount.

5. 300 gms. of naphthalene are heated with 15 gms. of iron hydroxide and 23 gms. of sulphur, that is 6 per cent excess over the amount equivalent to the iron, in an autoclave under the same conditions as in Experiment 1. The yield amounted to 76 per cent of hydronaphthalene of a specific weight of 0.973.

6. 300 gms. of naphthalene are heated with 15 gms. of cobalt hydroxide and 29 gms. of sulphur, that is 8 per cent excess over the amount equivalent to the cobalt, in an autoclave under the same conditions as in Experiment 1. The yield in hydronaphthalenes amounted to 92 per cent. The liquid product has a specific gravity of 0.960; only traces of unaltered naphthalene are present.

I claim:—

1. A process for the hydrogenation of naphthalene which consists in heating the naphthalene at a temperature above 380 degrees centigrade and below the point at which a sudden fall in temperature takes place in the presence of an excess of hydrogen and a catalyst containing a metal selected from the group consisting of iron, nickel and cobalt and an amount of hydrogen sulphide such as to increase the activity of said metal-containing catalyst, and maintaining the pressure in the reaction space at a value above 50 atmospheres.

2. A process for the hydrogenation of naphthalene which consists in heating the naphthalene at a temperature above 380 degrees centigrade, and below the point at which a sudden fall in temperature takes place in the presence of an excess of hydrogen and a catalyst containing an oxygen compound of a metal of the iron group and an amount of hydrogen sulphide such as to increase the activity of said metal-containing catalyst, and maintaining the pressure in the reaction space at a value above 50 atmospheres.

3. A process for the hydrogenation of naphthalene which consists in heating the naphthalene in the presence of an excess of hydrogen and a catalyst containing a metal selected from the group consisting of iron, nickel and cobalt at a temperature above 380 degrees centigrade and below the point at which a sudden fall in temperature takes place, and maintaining the pressure in the reaction space at a value above 50 atmospheres.

4. A process for the hydrogenation of naphthalene which consists in heating the naphthalene in the presence of an excess of hydrogen and a catalyst containing a metal selected from the group consisting of iron, nickel and cobalt at a temperature above 380 degrees centigrade and below the point at which a sudden fall in temperature takes place, maintaining an amount of hydrogen sulphide within the reaction space between the limits of 1 to 15% of the weight of the naphthalene, adjusting the amount of hydrogen sulphide between said limits to such an amount as to increase the activity of said catalyst and maintaining the pressure in the reaction space at a value above 50 atmospheres.

5. A process for the hydrogenation of naphthalene which consists in heating the naphthalene at a temperature less than 50 degrees below the point at which a definite fall in temperature takes place in the presence of an excess of hydrogen and a catalyst containing a metal selected from the group consisting of iron, nickel and cobalt and an amount of hydrogen sulphide such as to increase the activity of said metal-containing catalyst, and maintaining the pressure in the reaction space at a value above 50 atmospheres.

6. A process for the hydrogenation of naphthalene which consists in heating the naphthalene at a temperature approximately 20 degrees below the point at which a definite fall in temperature takes place in the presence of an excess of hydrogen and a catalyst containing a metal selected from the group consisting of iron, nickel and cobalt and an amount of hydrogen sulphide such as to increase the activty of said metal-containing catalyst and maintaining the pressure in the reaction space at a value above 50 atmospheres.

7. A process for the hydrogenation of naphthalene which consists in heating the naphthalene at a temperature above 380 degrees centigrade and below the point at which a sudden fall in temperature takes place in the presence of an excess of hydrogen and a catalyst containing a metal selected from the group consisting of iron, nickel and cobalt and an amount of hydrogen sulphide such as to increase the activity of said metal-containing catalyst and maintaining the pressure in the reaction space at a value above 50 atmospheres, the partial pressure of hydrogen in the reaction space being at least 75 per cent of the total pressure.

8. A process for the hydrogenation of naphthalene which consists in heating the naphthalene at a temperature above 380 degrees centigrade and below the point at which a sudden fall in temperature takes place in the presence of an excess of hydrogen and a catalyst containing a metal selected from the group consisting of iron, nickel and cobalt and an amount of hydrogen sulphide such as to increase the activity of said metal-containing catalyst and maintaining the pressure in the reaction space at a value above 50 atmospheres, the partial pressure of hydrogen in the reaction space being more than 95 per cent of the total pressure.

9. A process for the hydrogenation of naphthalene which consists in heating naphthalene containing its natural content of sulphur at a temperature somewhat below the point at which a sudden fall in temperature occurs and in the presence of an excess of hydrogen and a catalyst containing a metal selected from the group consisting of iron, nickel and cobalt, introducing hydrogen sulphide into the zone of the reaction and regulating the amount of hydrogen present so as to increase the activity of said metal-containing catalyst while maintaining the pressure in the reaction space at a value above 50 atmospheres.

10. A process for the hydrogenation of naphthalene in order to produce primary hydrogenation products thereof which consists in conducting the naphthalene with excess of hydrogen over a catalyst containing a metal selected from the group consisting of iron, nickel and cobalt, heating the mixture at a temperature below the point at which a sudden fall in temperature takes place, but not more than 100° C. below that point, and maintaining the pressure in the reaction space at a value above 100 atmospheres, the amount of hydrogen sulphide in the reaction vessel being continuously maintained at such a value that the activity of said metal-containing catalyst is increased.

In witness whereof I hereunto subscribe my name this 24 day of September, 1931.

Dr. RICHARD HUPE.